J. LAZARUS.
HORSESHOE.
APPLICATION FILED MAY 11, 1910.

964,438.

Patented July 12, 1910.

Witnesses.
Franklin E. Low.
Leonard A. Powell

Inventor:
Joseph Lazarus,
by his attorney

UNITED STATES PATENT OFFICE.

JOSEPH LAZARUS, OF BOSTON, MASSACHUSETTS.

HORSESHOE.

964,438.  Specification of Letters Patent.  Patented July 12, 1910.

Application filed May 11, 1910. Serial No. 560,614.

*To all whom it may concern:*

Be it known that I, JOSEPH LAZARUS, a citizen of the United States, residing at Boston, in the county of Suffolk and State of Massachusetts, have invented new and useful Improvements in Horseshoes, of which the following is a specification.

This invention relates to improvements in horseshoes, and the object is to provide a horseshoe having a reversible tread-piece having duplicate upper and lower sides provided with duplicate calks, and means to detachably attach the shoe to a hoof so that when one face of the shoe has become worn, the shoe may be reversed to bring the other face into use.

The object is further to provide a convenient and practical means for detachably attaching to the tread-piece a pair of straps for attaching the tread-piece to the hoof, said straps and said attaching means being so constructed as to readily permit the reversal of the shoe and yet forming a very secure means of attachment to the hoof so that the shoe is detachably attached to the horse's hoof for either temporary or permanent use and without the employment of nails.

To these ends, the invention consists in a horseshoe having a reversible tread-piece having duplicate upper and lower sides and means to detachably attach said tread-piece to a hoof.

The invention further consists in a horseshoe having a reversible tread-piece, a pair of straps to attach the same to a hoof, and a pair of hinge pins pivotally and detachably attaching said straps, respectively, to said tread-piece.

The invention finally consists in the novel features of construction and in the combination and arrangement of parts set forth in the following specification and particularly pointed out in the claims.

Figure 1:
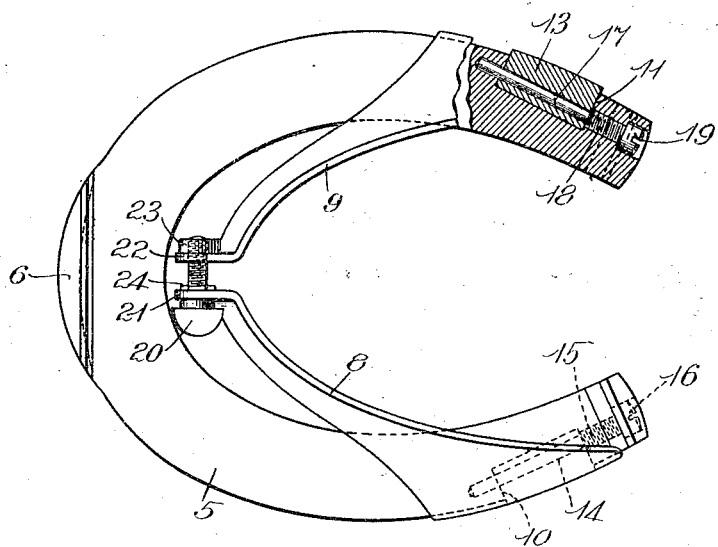
Figure 2:
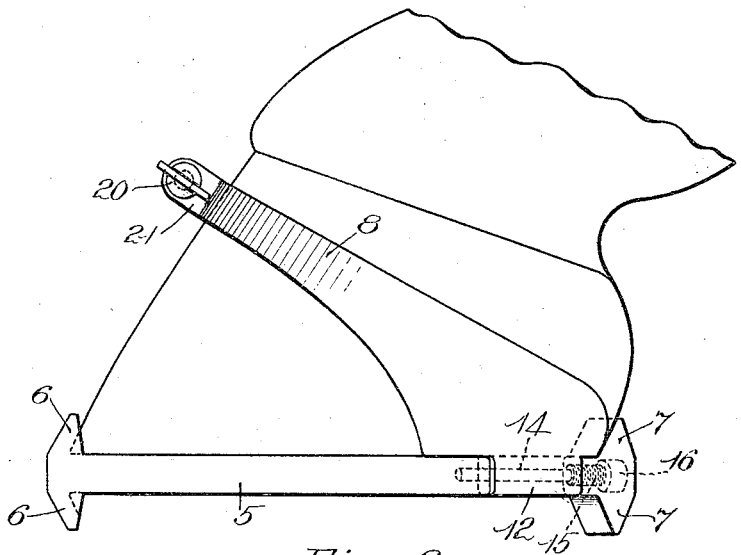

Referring to the drawing: Figure 1 is a plan of a horseshoe embodying my invention, partly broken away and shown in horizontal section on one side to illustrate the hinge pin. Fig. 2 is a side elevation of the horseshoe as applied to a hoof.

In the drawings, 5 is a tread-piece having substantially duplicate upper and lower sides and being provided with oppositely disposed toe calks 6, 6 projecting, respectively, upwardly and downwardly therefrom and being provided also with two pairs of duplicate heel calks 7, 7 oppositely disposed and projecting, respectively, upwardly and downwardly therefrom. These calks may be and preferably are sharpened, as shown.

The tread-piece is secured to the hoof by two lateral straps 8 and 9 preferably formed of metal extending obliquely upward from the rear portion of the shoe, said straps having suitable hinge connections with the tread-piece 5. For this purpose, the tread-piece is preferably provided with lateral recesses 10 and 11, the recess 10 receiving an ear 12 provided on the strap 8 and the recess 11 receiving an ear 13 provided on the strap 9.

A hinge pin 14 extends into the tread-piece 5 from the rear thereof and through the ear 12, said pin being preferably shouldered and provided with a screw-threaded portion 15 having screw-threaded engagement with the tread-piece 5 and being provided with a flush head 16. In like manner, the strap 9 is pivotally connected to the tread-piece 5 by a hinge pin 17 having a screw-threaded portion 18 and a flush head 19. By means of these two hinge pins, the straps 8 and 9 are pivotally and detachably attached to the tread-piece 5. By the simple removal of these two hinge pins, it is possible to reverse the tread-piece when it has become worn on one side and it is consequently unnecessary to replace the shoe until such time as both faces of the shoe have become worn to such an extent as to make it necessary to either renew the calks or to renew the entire tread-piece.

The free ends of the straps 8 and 9 are adjustably connected to each other by any suitable means such, for example, as a screw 20 passing through an ear 21 on the strap 8 and having screw-threaded engagement with an ear 22 on the strap 9, said screw being locked by a lock-nut 23 having screw-threaded engagement therewith. To prevent the screw from dropping out of the ear 21, said screw may be provided with a pin 24 passing therethrough. By means of this screw, the free ends of the straps may be drawn toward each other to firmly clamp the same against the sides of the hoof, it being observed that the connections of the straps with the tread-piece are at the rear of the greatest width thereof and it will also be observed that said straps are widened considerably just above their ears. By thus widening the straps, especially from the ears toward the rear, the tread-piece is very firmly held and no slipping action takes place, yet the shoe may be easily and quickly removed, if desired, by the simple removal of the screw 20.

When once the shoe is removed it is a matter of only a few minutes time to remove the hinge pins and reverse the tread-piece.

Having thus described my invention, what I claim and desire by Letters Patent to secure is:

1. A horseshoe having, in combination, a reversible tread-piece having oppositely disposed toe-calks and two oppositely disposed pairs of heel-calks, two straps, means to detachably attach said straps to said tread-piece at opposite sides thereof, and means to connect said straps to each other.

2. A horseshoe having, in combination, a reversible tread-piece having oppositely disposed toe-calks and two oppositely disposed pairs of heel calks, and means to detachably attach said tread-piece to a hoof.

3. A horseshoe having, in combination, a reversible tread-piece having duplicate upper and lower sides, a pair of straps detachably attached to said tread-piece at opposite sides thereof, and means to connect said straps to each other.

4. A horseshoe having, in combination, a reversible tread-piece having duplicate upper and lower sides, a pair of straps, hinge pins constituting detachable pivotal connections, respectively, between said straps and said tread-piece, and means to connect said straps to each other.

5. A horseshoe having, in combination, a reversible tread-piece having duplicate upper and lower sides, a pair of straps, hinge pins extending into said tread-piece from the rear thereof and forming detachable pivotal connections between said straps, respectively, and said tread-piece, and means to connect said straps to each other.

6. A horseshoe having, in combination, a reversible tread-piece having duplicate upper and lower sides and provided with opposite lateral recesses, a pair of straps extending into said recesses, respectively, hinge pins extending into said tread-piece from the rear thereof and into said straps, respectively, and means to connect said straps to each other.

7. A horseshoe having, in combination, a reversible tread-piece having duplicate upper and lower sides and provided with opposite lateral recesses, a pair of straps extending into said recesses, respectively, hinge pins having screw-threaded engagement with said tread-piece and extending into said straps, respectively, and means to connect said straps to each other.

In testimony whereof I have hereunto set my hand in presence of two subscribing witnesses.

JOSEPH LAZARUS.

Witnesses:
Louis A. Jones,
Annie J. Dailey.